Oct. 30, 1923.
C. J. METTLER
1,472,611
CHILD'S VEHICLE
Filed March 1, 1920
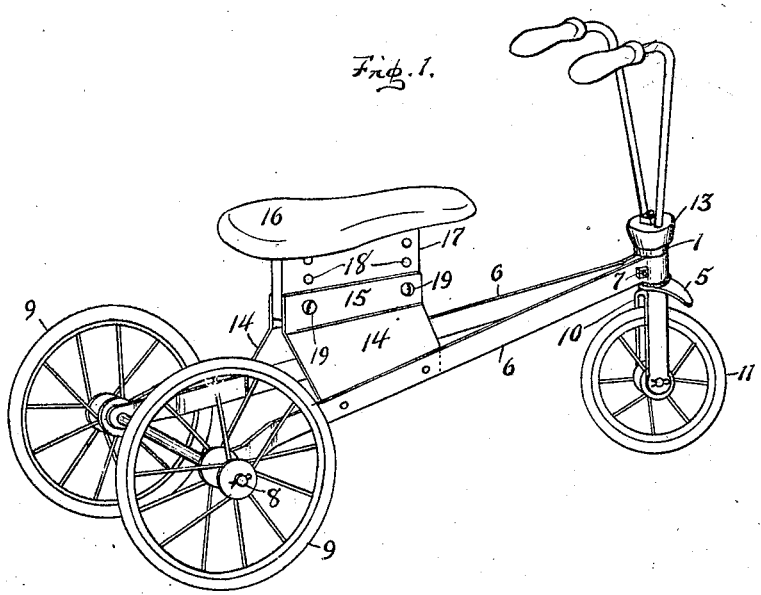
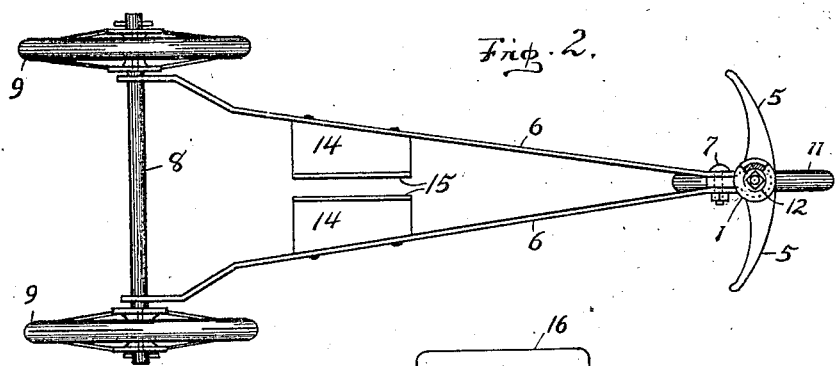
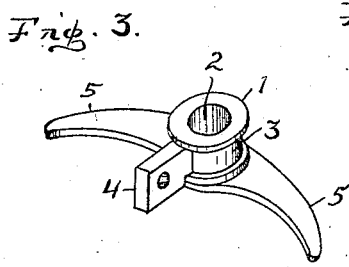
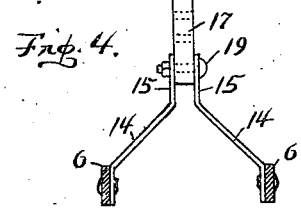
Inventor
Clement J. Mettler
By
H. G. Burns  Attorney Patented Oct. 30, 1923.

1,472,611

UNITED STATES PATENT OFFICE.

CLEMENT J. METTLER, OF FORT WAYNE, INDIANA.

CHILD'S VEHICLE.

Application filed March 1, 1920. Serial No. 362,252.

*To all whom it may concern:*

Be it known that I, CLEMENT J. METTLER, a citizen of the United States of America, and resident of Fort Wayne, in the county of Allen and State of Indiana, have invented certain new and useful Improvements in Children's Vehicles, of which the following is a specification.

This invention relates to improvements in child's vehicles and the objects thereof are: first, to afford in a device of its class a substantial seat support having means of simple vertical adjustment; second, to so form the head of the frame that it may be rigidly held in place in connection with the reaches by the use of a single bolt or rivet; and third, to construct the device so that its manufacture may be effected economically.

The objects of the improvement are accomplished by the construction illustrated in the accompanying drawings in which:

Fig. 1 is a perspective view of the vehicle;

Fig. 2 is a plan view of the vehicle with the seat and steering member omitted and showing the frame head partly broken away and in section;

Fig. 3 is a perspective view of the frame head; and

Fig. 4 is a rear elevation of the seat and its support, the reaches of the frame being in section.

Similar characters of reference indicate corresponding parts throughout the several views and referring now to the same:

1 is a casting forming the frame head which is provided with a vertical opening 2 and a horizontal recess 3 in its exterior from which extends an integral perforated lug 4. The head has also oppositely disposed lateral projections 5 which serve as foot rests.

To the head 1 is secured a pair of divergently disposed reaches 6 which are formed of a single metallic bar bent at its middle portion so as to fit in the recess 3 in the head and is secured in place by a bolt 7 that extends through the reaches and the lug 4 so that the latter is clamped therebetween. The rear ends of the reaches are supported upon an axle 8 that extends therethrough and which has mounted on its respective projecting ends corresponding wheels 9. A fork 10 having a wheel 11 mounted therein is positioned with its post 12 extending upwardly through the opening 2 in the head, and to the upper end of the post is rigidly secured a steering member 13 by which the fork is adapted to be turned so as to effect steerage of the vehicle.

On the reaches are mounted a pair of oppositely disposed plates 14, the upper marginal portions 15 of which are arranged in parallel relation with each other and spaced apart, and the lower marginal portions of which are spaced farther apart and extend divergently relative to each other.

A seat 16 is rigidly mounted upon a vertically disposed plate 17 that extends lengthwise and is adapted to fit in between the marginal portions 15 of the supporting plates 14, and has near each end thereof a series of holes 18. The plate 17 is adapted to be clamped between the supporting plates by means of bolts 19 that extend through the corresponding holes in the plate accordingly as the seat is vertically positioned. When the seat is thus secured between the supporting plates it is held in rigid position and also the reaches are held properly spaced apart by said supports 14, thus effecting rigidity of both the frame and the seat.

In using the invention, propulsion is effected by the occupant while sitting upon the seat by applying force upon the ground with the feet, and steerage is effected by manipulating the steering member in the usual manner. The foot rests are held in rigid relation with the frame of the vehicle so that steerage is in no way effected by their use. The elevation of the seat is changed to suit the stature of the occupant as occasion requires by removing the bolts 19 and shifting the plate 17 between the supporting plates and reinserting the bolts through other pairs of holes 18 accordingly as the seat is positioned.

What I claim is:

1. In a device of the class described, a frame including a head and divergent reaches; an axle supporting the reaches at the rear end thereof; a wheel on each end of the axle; a steering fork having a wheel mounted therein and having a post extending through the head; a steering member fixed on the post for turning the fork; a pair of supporting plates, the lower marginal portions of which are fixed respectively on said reaches, the upper marginal portions thereof being parallel with each other and spaced apart; and a seat including a downwardly extending plate adjustably secured between the upper marginal portions of the supporting plates, said plates being adapted to rigidly support the seat and also hold the reaches divergently spaced apart.

2. In a vehicle frame including a head and pair of divergent reaches secured thereto; a pair of separate and oppositely positioned supporting plates, the lower edges of which are longitudinally divergent and secured respectively to said reaches, and the upper edges of which are flat and parallel with each other; a seat including a downwardly extending plate adjustably positioned between the upper flat portions of said plates; and means for clamping said plates together.

3. In a frame for vehicles, a head casting having a horizontal recess in its exterior and projecting lug in the plane thereof and having also a pair of laterally projecting foot rests; a pair of reaches formed of a bar, the middle portion of which is bent so as to fit in the recess; and means for clamping the lug between the reaches.

In testimony whereof I affix my signature, in presence of two witnesses.

CLEMENT J. METTLER.

Witnesses:
 BEATRICE LEHMAN,
 WALTER G. BURNS.